United States Patent [19]

Laux et al.

[11] Patent Number: 4,644,650
[45] Date of Patent: Feb. 24, 1987

[54] MANUALLY OPERATED CUTTING TOOL

[75] Inventors: Friedrich-Günther Laux; Steffen Laux, both of Königsweg 304, D-1000 Berlin West, Fed. Rep. of Germany

[73] Assignees: Friedrich-Gunther Laux; Steffen Laux, both of West Berlin, Fed. Rep. of Germany

[21] Appl. No.: 800,463

[22] Filed: Nov. 21, 1985

[30] Foreign Application Priority Data

Dec. 14, 1984 [SE] Sweden ............................ 8406388

[51] Int. Cl.$^4$ ............................................ B26B 13/08
[52] U.S. Cl. ........................................ 30/250; 30/92
[58] Field of Search ................. 30/249, 250, 252, 253, 30/92, 254

[56] References Cited

U.S. PATENT DOCUMENTS

| 2,794,250 | 6/1957 | Bethune | 30/254 |
| 2,870,538 | 1/1959 | Townshend | 30/254 |
| 2,875,520 | 3/1959 | Webster | 30/254 |
| 3,922,783 | 12/1975 | Hayes | 30/250 |
| 4,055,891 | 11/1977 | Wick | 30/250 |
| 4,223,439 | 9/1980 | Rommel | 30/250 |

Primary Examiner—Jimmy C. Peters
Attorney, Agent, or Firm—Karl F. Ross; Herbert Dubno

[57] ABSTRACT

A manually operated cutting tool has a pair of handles, a stationary cutting plate to which one handle is attached pivotally and the other one rigidly, and a rotary knife also pivotally attached to the cutting plate. A force-and-motion transmission mechanism between the movable handle, which is mounted with the aid of a pivot pin, and the rotary knife, is defined by an excenter drive comprising a cylindrical block affixed to the movable handle excentrically relative to the pivot pin, and a driving pawl having a circular opening for accommodating said block and a toothing for engagement with a circular row of teeth provided on the outer edge of the rotary knife. The rotary knife has at its inner edge a curvilinear cutting edge which, being generally concave, may have two convex projections, a first one adjacent the end opposite the location of the pivotal attachment, and the other projection, less sharp than the first one, between the first one and the end adjacent the pivotal attachment.

13 Claims, 11 Drawing Figures

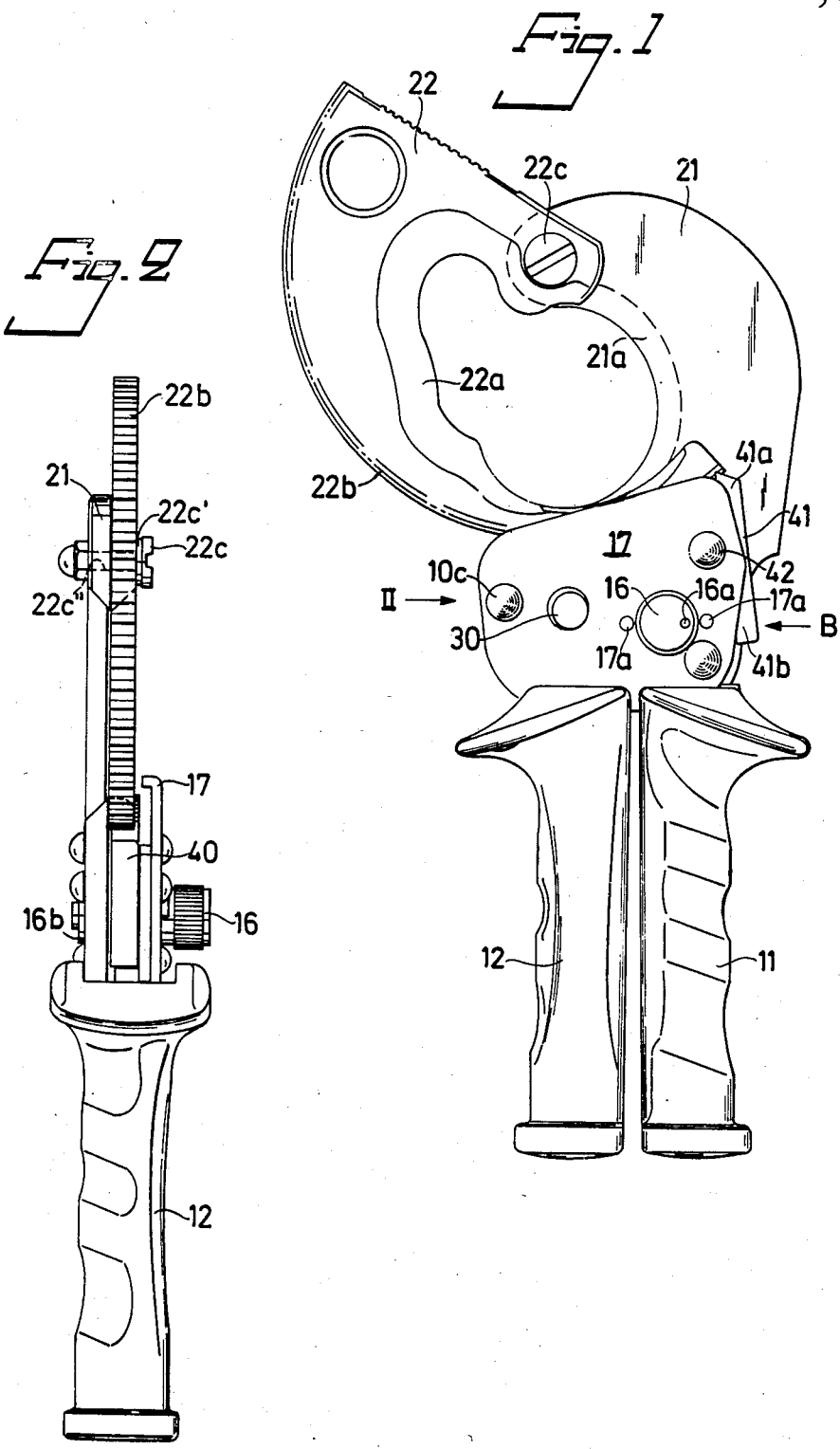

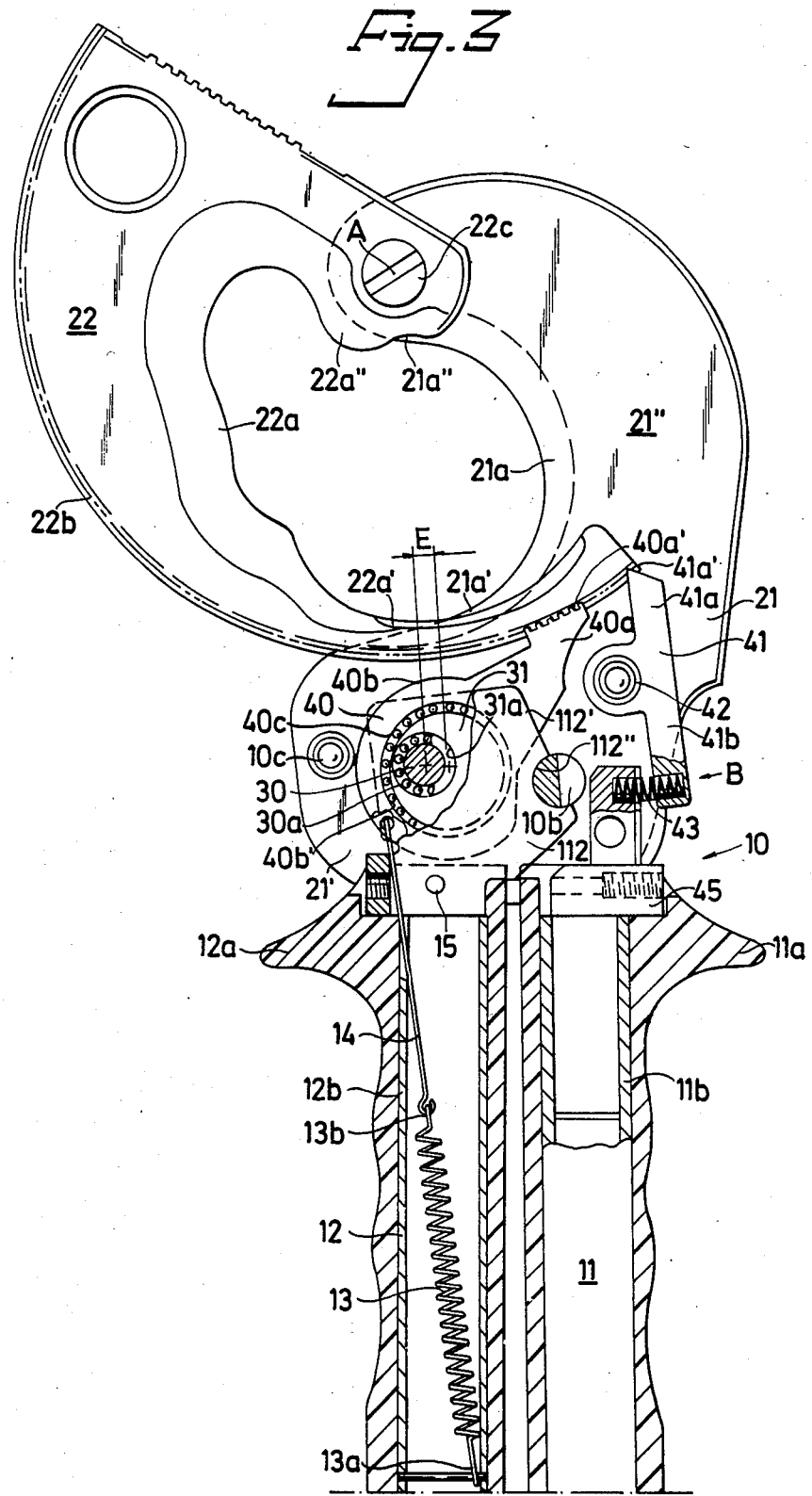

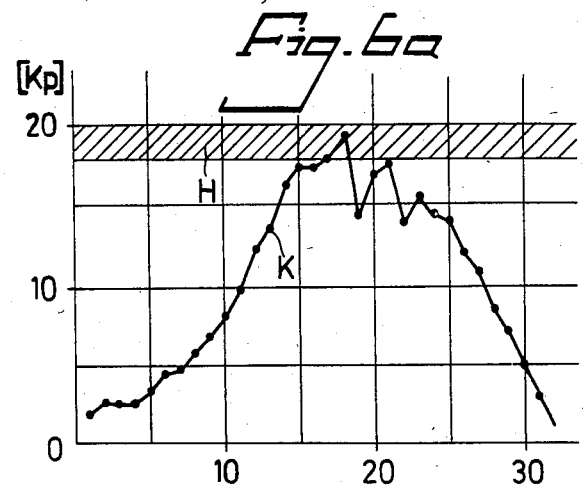
Fig. 6a
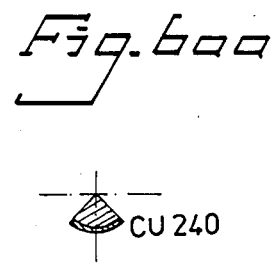
Fig. 6aa
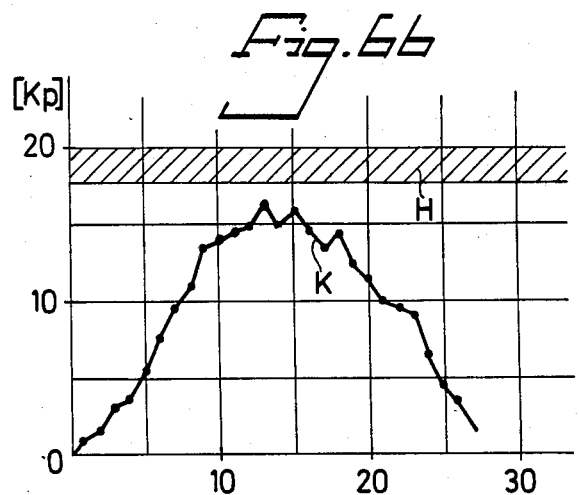
Fig. 6b
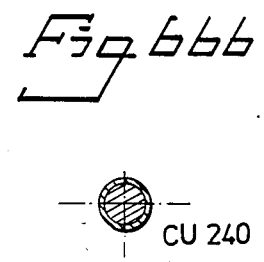
Fig. 6bb
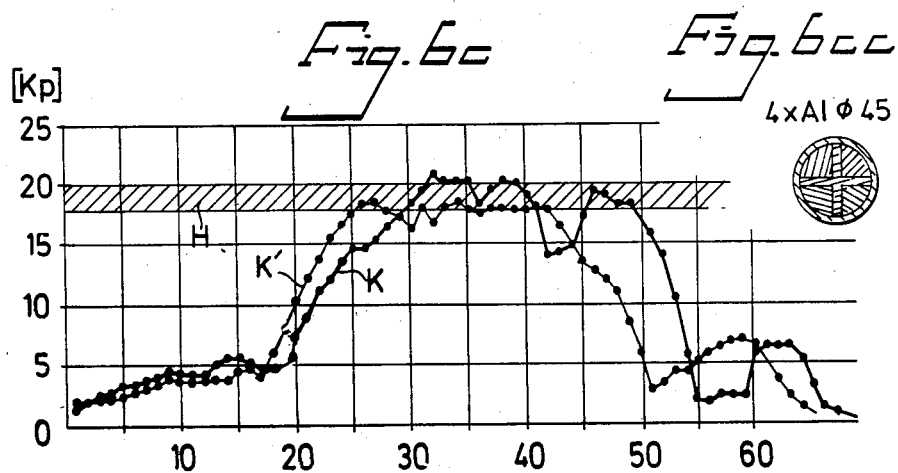
Fig. 6c
Fig. 6cc

4,644,650

MANUALLY OPERATED CUTTING TOOL

FIELD OF INVENTION

The present invention relates to a manually operated cutting tool, particularly a cable cutter, of the type comprising a stationary cutting plate having at one end a mounting portion and adjacent thereto a cutting portion with an outer periphery and an inner periphery, a first curvilinear cutting edge extending along the inner periphery between a first end adjacent the mounting portion and a second end remote therefrom; a rotary knife member having a circular outer periphery and an inner periphery, a row of teeth arranged along the outer periphery and a second curvilinear cutting edge arranged along the inner periphery between a first end and a second end and facing the first cutting edge; a pivotal connection between the cutting plate and the knife member in the region of both the second ends, and the the row of teeth being centered on the pivotal connection; a stationary first handle rigidly connected at one end with the mounting portion; a movable second handle having at one end an attachment part for pivotal connection to the mounting portion; and a force-and-motion transmission means interposed between the end of the second handle and the outer periphery of the knife member for transforming strokes of the second handle into a pivotal closing movement of the knife member toward the cutting plate.

BACKGROUND OF THE INVENTION

In such tools, the rotary knife is set in motion by strokes of the second handle transmitted by the transmission means or mechanism and a workpiece inserted between the two cutting edges is severed as the clear span between the two cutting edges continously decreases. Up to now, both of the cutting edges, i.e. as well on the stationary cutting plate, as on the rotary knife, have been made exclusively concave, i.e. without any convex projections.

In order to achieve high cutting forces, mechanical drives such as toothed gears or toggle lever drives have been used hitherto as the force-and-motion transmitting means. Because of the high transmission ratio needed, and with regard to the mechanical strength of the components which can be achieved, toothed gears are less appropriate for a light, manually operated tool. As to toggle lever drives, the transmission ratio is again a limiting factor as to how great dimensions can be chosen, because the lever joints cannot be arranged arbitrarily close to one another, because with increasing transmission forces, increased diameters of the joint bolts call for an increased spacing and the transmission ratio is reduced. If the diameter of the rotary knife would be increased, a greater, heavier and more expensive tool would be obtained.

OBJECTS OF THE INVENTION

It is an object of the present invention to provide a tool of the aforementioned kind which, as a rule driven by one hand of a user having an average hand power and an average hand span, has a significantly higher transmission ratio than known devices of the same kind.

Another object is to provide a novel geometry of the cutting edge on the rotary knife which enlarges the range of application of the tool in particular to larger cables with sector construction, i.e. the so-called shape conductors.

SUMMARY OF THE INVENTION

The tool of the afore mentioned kind is according to the invention, improved by having the force-and-motion transmission means being embodied as a high-power-transmitting excentric drive comprising a pivot pin means for pivotally attaching the second handle to the mounting portion at a fixed location; a cylindrical block rigidly affixed to the attachment part with selected excentricity other than zero relative to the pivot pin means; a driving pawl member having an engagement portion provided with a toothing for engagement with the row of teeth and a supporting portion provided with a circular opening for accomodating the cylindrical block, and the pawl being rotationally mounted on the block with the aid of the opening; a resilient member affecting the pawl so as to urge the toothing into engagement with the row of teeth; and a releasable retaining latch meshing with the row of teeth so as to prevent a return movement thereof, unless released.

The geometry of the second cutting edge on the rotary knife may be in a novel way adapted to the progress of the load by the second cutting edge comprising, successively from the first end thereof to the second end, a reception zone without a cutting function, a first cutting zone comprising a first convex projection, a second cutting zone terminating in an uphill part of a second convex projection, a third cutting zone beginning in the downhill part of the second convex projection, and an all-concave forth terminal cutting part. In other words, the second cutting edge may comprise adjacent its first end a first convex projection defining the location of a first cut into the work-piece, and a second convex projection between the first convex projection and its second end, the second projection being less sharp than the first one.

BRIEF DESCRIPTION OF THE DRAWING

These and other features of the invention will become more clear from the study of the enclosed drawing in which FIG. 1 shows an elevational view of the tool of the invention;

FIG. 2 shows a side view of the same tool in the sense of arrow II in FIG. 1;

FIG. 3 shows the same elevational view as FIG. 1, but on a greater scale, partly in section and with a covering plate removed;

FIGS. 6a to 6c show curves characterizing the cutting process in the tool of the invention, and FIGS. 6aa to 6cc show cross-sections through cables corresponding to FIGS. 6a to 6c.

SPECIFIC DESCRIPTION

Figure 4:
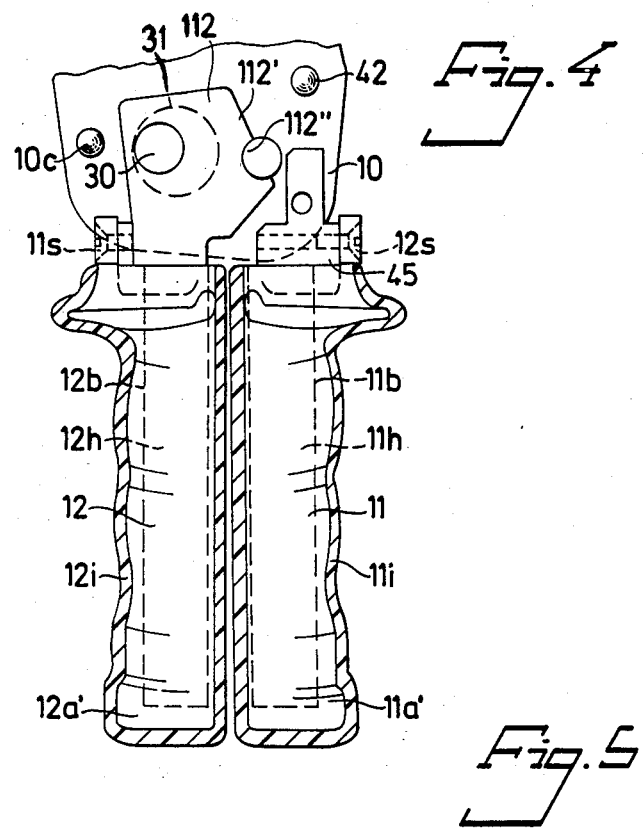
FIG. 4 shows an elevational view, partly in section, and on the same scale as FIGS. 1 and 2, of the lower part of a modified embodiment of the tool of the invention.

As appears from the FIGS. 1 to 5, a tool according to the present invention has a stationary cutting plate 21 and an unmovable first handle 11 rigidly attached thereto. The cutting plate 21 comprises a lower mounting portion 21' and an adjacent upper cutting portion 21" which has an inner periphery, at the left hand in the drawing, and an outer periphery, at the right hand in the drawing. Along the inner periphery there is a curvilinear, viz. concave first cutting edge 21a extending between a first end 21a' adjacent the mounting part 21', and a second end 21a" remote from the mounting part 21'. To the cutting plate 21 in the region of said first end 21a' the first handle 11 is rigidly connected by means of a member 45. The cutting plate 21 defines together with said handle a single rigid structural unit 10.

A rotary knife member 22 is at a knife pivot point A in the region of said second end 21a" pivoted to the cutting plate 21 by means of a spring loaded (spring 22c', FIG. 2) screw 22c. The inner periphery of the rotary knife member 22 defines a second cutting edge 22a extending between a first end 22a' remote from the knife pivot point A and a second end 22a" adjacent said pivot point A.

Figure 5:
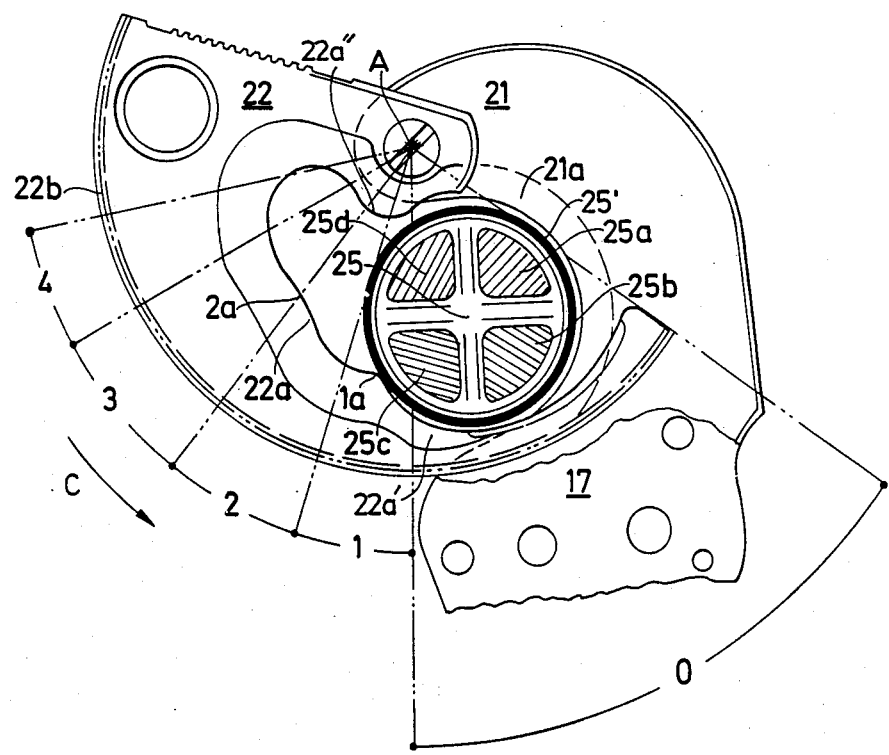
FIG. 5 shows an elevational view, on the same scale as FIG. 3, of the upper part of the tool of FIGS. 1 to 3.

The shape of the cutting edge 22a is adapted to the quantity of cutting work which has to be delivered at each phase of the cutting operation (see FIG. 5 and the description thereto). The shape of the second cutting edge 22a contributes to an appreciable degree to the ease of operation of the tool and to a reduction of the peak strain imposed on the different parts of the tool.

The rotary knife member 22 has a circular outer periphery which is provided with a row of teeth 22b having its center of curvation in the said knife pivot point A, where also a bore 22c" (FIG. 2) for said screw 22c is located. The knife member 22 and the cutting plate 21 are thus pivoted one to another in the region of both said second ends 21a", 22a" of the cutting edges 21a and 22a respectively with the aid of a pivotal connection defined by the said screw 22c and bore 22c".

A movable second handle 12 has at its upper end an attachment part defined by a plate member 112, partially broken away in FIG. 3, to which a cylindrical block 31 is is non-rotationally attached. In the block 31 is a bore 31a excentrically arranged which accommodates an antifriction bearing defined by a needle bearing 30a, partially broken away in FIG. 3.

The movable handle 12 is pivotally mounted in the mounting portion 21' with the aid of a cylindrical pivot pin means 30 affixed in the mounting portion 21' and projecting into the bore 31a and the needle bearing 30a. It will be readily understood that the attachment part 112 and/or the cylindrical block 31 also may be provided with a nonrotatably attached pivot pin which, with or without the aid of an antifriction bearing, is rotarily mounted in the mounting part 21', and no bore in the cylindrical block 31 will then be necessary.

A driving pawl member 40 (FIG. 3) has an engagement or meshing part 40a and a support part 40b. The engagement part carries a toothing 40a' meshing with the row of teeth 22b on the rotary knife member 22, and in the supporting part 40b is a circular opening 40b' provided in which another antifriction bearing defined by a needle bearing 40c is accommodated. The pawl member 40 is with the aid of this opening 40b' rotationally mounted on the cylindrical block 31.

Use of friction reducing needle bearings improves the effectiveness of the tool so much, that new fields of application are opened and the tool may be optimally adapted to the average hand power and the average hand span of a user. The side strength and the bending strength of the gear teeth 22b and 40a and the load which may be imposed on the bearings 30a and 40b, define essentially the limiting values governing the construction of the critical parts of the tool.

The force to be applied to the handles shall not transgress the hatched zone H in FIGS. 6a to 6c (the peak values of the force characteristics K in these Figures have already been reduced by the novel geometry of the cutting edge 22a, an increased number of handle strokes being tolerated for the sake of a longer tool life).

An excentric drive offers in comparison with a toggle lever drive substantial structural advantages. As the the selected excentricity E (FIG. 3), which however never is zero, between the geometrical centers of the cylindrical block 31 and the pivot pin 30 is smaller, the greater are the driving forces which are transmitted via the pawl 40 to the row of teeth 22b, and the more advantegeously can the cylindrical block 31, the needle bearing 40c and the pawl 40 be dimensioned and located, and the pivot pin 30, the needle bearing 30a, and the excentric bore 31a be dimensioned.

Both handles 11, 12 are embodied by inner tubes 11b, 12b covered by profiled plastic coverings 11a, 12a. A tension spring 13 is with the aid of an eylet 13a at one end affixed in the tube 12b and the other end of said spring 13 is with the aid of a pulling link 14 attached to the mounting part 40b of the pawl member 40 so as to bring the engagement part 40a thereof into engagement with the row of teeth 22b and to hold it in engagement therewith when not overcome by some other force. The spring 13 fills at the same time also a second function, viz. to pivot the second handle 12 into a swung-out position relative to the first handle 11, a spacer bushing 10c limiting the swing-out angle.

A tap or stop bolt 15, the function of which will be explained more in detail later on, is provided on the attachment part 112 at a location where the inner tube 12 is connected to this attachment part.

A semi-circular recess 112" is arranged in one side edge 112' of the plate 112 defining the attachment part of the handle 12, and a locking spindle 10b is rotarily mounted in the mounting portion 21'. The spindle 10b is at least in the part located adjacent said recess 112", and in an axial length corresponding to the thickness of the plate 112, milled down approximately to half the diameter. The spindle 10b is located in the mounting portion 21' so that, in dependence of the rotational position of the spindle, either the remaining part thereof is accomodated in said recess, as shown in FIG. 3, and blocks the plate 112 and thereby also the handle 12, or that the milled-down part gives the plate 112 free. The recess 112" is located in such a manner relative the locking spindle 10b that locking of the second handle 12 occurs when the handle is situated closest to the first handle 11. When the locking spindle 10b is in its non-engagement position, the handle 12 is free to be swung out, by the spring 13, into an end position defined by the left hand edge (broken away in FIG. 3) of the attachment part 112 striking against the spacer 10c.

The locking spindle 10b and the recess 112" define thus an arresting mechanism. On a covering plate 17 (FIGS. 1 and 7) are markings 17a in different colors provided which together with a marking 16a on a control knob 16 indicate on the outside of the tool the rotational position of the locking spindle 10b.

The control knob 16 (FIGS. 1 and 2) is provided on one free end of the spindle 10b and is attracted against the covering plate 17 by the effect of a resilient washer 16b mounted on the other free end of the shaft 10b. Thus the spindle 10b is by frictional resistance secured against unvoluntary rotation.

On the mounting portion 21 is further a spacer bushing 42 arranged which on the one hand, together with the spacer bushing 10c, carries the said covering plate 17 at a selected spacement from the mounting portion 21', and on the other hand serves as a pivotal mounting for a retaining latch 41 embodied by a two-armed lever. One arm 41a thereof extends toward the row of teeth 22b and is provided with an edge 41a' for engagement with the row of teeth 22b, and the other arm 41b is at B accessible for pressure from the outside. A compression spring 43 constantly urges the the retaining latch 41 toward the row of teeth 22b.

A certain number of strokes of the movable handle 12 is necessary for transmitting a certain amount of cutting force to the rotary knife 22. By the novel shape of the cutting edge 22a of this knife member 22 the cutting effect necessary in a single stroke can be positively influenced, i.e. reduced. According to FIG. 5, the second cutting edge 22a is divided in five sectors 0 to 4 which correspond to different operationalphases and which come into action one after another in the course of the rotational movement of the knife 22:

1st operational phase: in a reception zone 0 an inserted work-piece such as the cable 25 is gripped by both cutting edges 21a and 22a, but not yet actually incised;

2nd operational phase: in a first cutting phase the outer insulating layer 25' of the cable 25 is rapidly penetrated by a precutting zone 1 of the second cutting edge 22a comprising a first rather sharp convex projection 1a;

3rd operational phase: in a second cutting phase the outer peripheries of several cable sectors such as 25a to 25d are incised by a zone 2 of the second cutting edge 22a comprising the "uphill" portion of a second convex projection 2a, less sharp than the first one; the whole mass of the cable is compressed and cutting forces increase rapidly;

4th operational phase: in a third cutting phase, at a zone 3 comprising the "downhill" portion of the convex projection 2a, the increase of the cutting forces is diminished due to a protracted cutting action;

5th operational phase: in a final fourth cutting phase the metal parts of the cable are severed by a continued protracted cutting action in a markedly concave zone 4 which lies closest to the knife pivot point A, so that the effective lever arm decreases to a minimal value.

Thus, the second cutting edge 22a comprises successively from the first end 22a' thereof to the second end 22a" a reception zone 0 without cutting function, a first cutting zone 1 with a first convex projection 1a, a second cutting zone 2 terminating in an uphill part of a second convex projection 2a, a third cutting zone 3 beginning in the downhill part of said second convex projection 2a, and a terminal fourth cutting zone 4,—all-concave and most concave of all zones.

The first convex projection 1a lies in the region of the first end 22a' and the second convex projection 2a, less sharp than the first one, lies between the first convex projection 1a and the second end 22a", more specifically at the transition between the zones 2 and 3.

When the cable 25 has been completely severed, the rotary knife 22 can be freely rotated further in the sense of arrow C, i.e. in the same sense as during the operational movement, because the driving pawl 40, as well as the retaining latch 41, allow the row of teeth 22b to freely glide past.

A return movement of the rotary knife 22 is possible from every rotational position thereof. Before the handle 12 has been fully swung out (i.e. before it has struck the spacer bushing 10c), the pulling link 14 of the spring 13 bears against the stop bolt 15 and rotates the driving pawl 40 out of engagement with the row of teeth 22b. The spring-loaded retaining latch 41 prevents a return movement of the rotary knife member 22 only so long as it is not depressed at B. When the latch 41 is depressed at B, the rotary knife 22 may be rotated backward when also the movable handle 12 has been by hand pivoted till it bears against the spacer bushing 10c.

For a next cutting operation, the rotary knife 22 is again rotated till it bears against an inserted cable (the position shown in FIG. 5), the retaining latch 41 preventing a reverse movement, and with the first strokes of the handle 12 a new severing operation is started.

While in the FIGS. 1 to 3 has been shown that the inner tubes 11b, 12b are covered with positively adhering plastics gripping handles 11a, 12a, in FIG. 4 is shown an embodiment for treating cables with an impressed voltage and having regulatory insulating handles defined by gripping bushings 11a', 12a' embodied by prefabricated, shaped members with insulating layers 11i, 12i, and which with the aid of screws 11s, 12s are affixed to the member 45 (a tube holder) and the mounting plate 112 respectively. The two handles 11, 12 or, more correctly, the two inner tubes 11a', 12', have internal cavities 11h, 12h and in the cavity 12h is the spring 13, not shown in FIG. 4, mounted in the same way as illustrated in FIG. 3.

In the FIGS. 6a to 6c are shown three curves K which are characteristic for the progress of the severing operation in the tool of the invention. The cross-sections of the respective cable types are shown in FIGS. 6aa to 6cc. On the axis of abscissas is in FIGS. 6a to 6c the number of necessary strokes of the handle 12 plotted, and on the axis of ordinates the necessary force in kiloponds. From FIG. 6c which refers to severing a so-called shaped conductor 25 according to FIGS. 5 and 6cc, it will be realized that the peak load has decreased and is distributed to a number of operational strokes, in contrast to the curves K in the FIGS. 6a and 6b which refer to single-wire cables with relatively small diameters according to FIGS. 6aa and 6bb and where severing occurs only in the second and third cutting phase.

The curve K' in FIG. 6c refers to the same cable 25 as the curve K, but illustrates the case when this "sectored" cable is inserted in the tool in a different rotary position.

The hatched area H defines in FIGS. 6a to 6c, as already stated, the area of acceptable peak values of stress. The distribution of the peak load, achieved according to the invention, allows a use of this manually operated tool also for tasks where only hydraulic devices and other devices driven by some other force than the operator's hand power had to be used heretofore. It will be also appreciated that the tool of the invention may be used for severing other objects than electrical conductors.

We claim:

1. A manually operated cutting tool, particularly a cable cutter, comprising in combination a stationary cutting plate having at one end a mounting portion and adjacent thereto a cutting portion with an outer periphery and an inner periphery, a first curvilinear cutting edge extending along said inner periphery between a first end adjacent said mounting portion and a second end remote therefrom; a rotary knife member having a circular outer periphery and an inner periphery, a row of teeth arranged along said outer periphery and a second curvilinear cutting edge arranged along said inner periphery between a first end and a second end and facing said first cutting edge; a pivotal connection between said cutting plate and said knife member in the region of both said second ends and said row of teeth being centered on said pivotal connection; a stationary first handle rigidly connected at one end with said mounting portion; a movable second handle having at one end an attachment part for pivotal connection to said mounting portion; and a force-and-motion transmission means interposed between said end of said second handle and said outer periphery of said knife member for transforming strokes of the second handle into a pivotal closing movement of the knife member toward the cutting plate, wherein said means is embodied by a high-power-transmitting excenter drive comprising a pivot pin means for pivotally attaching said second handle to said mounting portion at a fixed location; a cylindrical block rigidly affixed to said attachment part with selected excentricity other than zero relative said pivot pin means; a driving pawl member having an engagement portion provided with a toothing for engagement with said row of teeth and a supporting portion provided with a circular opening for accomodating said cylindrical block, and said pawl being rotationally mounted on said block with the aid of said opening; a resilient member affecting said pawl so as to urge said toothing into engagement with said row of teeth; and a releasable retaining latch meshing with said row of teeth so as to prevent a return movement thereof, unless released.

2. The tool of claim 1 wherein said pivot pin means has a smaller diameter than said cylindrical block, and bores through which the pivot pin means can pass are provided in said mounting part, in said cylindrical block and in said attachment part.

3. The tool of claim 2 wherein an antifriction bearing is provided in at least one of said circular opening and bores.

4. The tool of claim 3 wherein the bearing is a needle bearing.

5. The tool of claim 1 wherein at least in the handle which is movable is an inner cavity provided and said resilient member is a tension spring anchored at one end in said cavity and at the other end on said pawl.

6. The tool of claim 5 wherein the spring is attached to the pawl by a pulling link and a stop means is provided against which the pulling link strikes in a swung-out position of the movable handle.

7. The tool of claim 1 further comprising a stop-and-locking means for said stop-and-locking movable handle, said means comprising a recess on an edge of said attachment part and a locking spindle rotatably mounted in said mounting portion and having adjacent said recess a part with decreased diameter, said spindle being located so that said part, in dependence of the rotational position of the spindle, either clears or occupies said recess.

8. The tool of claim 7 which is provided on the outside with markings indicating the rotational position of the locking spindle.

9. The tool of claim 1 wherein said retaining latch is defined by a spring-loaded, two-armed lever pivotally mounted in said mounting portion, a first arm thereof extending toward said row of teeth and being provided with an engagement tip and a second arm thereof being accessible from the outside for a releasing presure.

10. The tool of claim 1 further comprising a covering plate mounted by spacer bushings spacedly from and parallel with said mounting portion, and having openings for accomodating free ends of said pivot pin means and said locking spindle.

11. The tool of claim 1 wherein said second cutting edge comprises, successively from the first end thereof to the second end, a reception zone without cutting function, a first cutting zone with a first convex projection, a second cutting zone terminating in an uphill part of a second convex projection, a third cutting zone beginning in the downhill part of said second convex projection, and an all-concave terminal fourth cutting zone.

12. The tool of claim 1 wherein said second cutting edge comprises a first convex projection in the region of its first end and a second convex projection, less sharp then the first one, between the first convex projection and its second end.

13. A manually operated cutting tool, particularly a cable cutter, comprising in combination a stationary cutting plate having at one end a mounting portion and adjacent thereto a cutting portion with an outer periphery and an inner periphery, a first curvilinear cutting edge extending along said inner periphery between a first end adjacent said mounting portion and a second end remote therefrom; a rotary knife member having a circular outer periphery and an inner periphery, a row of teeth arranged along said outer periphery and a second curvilinear cutting edge arranged along said inner periphery between a first end and a second end and facing said first cutting edge; a pivotal connection between said cutting plate and said knife member in the region of both said second ends, and said row of teeth being centered on said pivotal connection; a stationary first handle rigidly connected at one end with said mounting portion; a movable second handle having at one end an attachment part for pivotal connection to said mounting portion; and a force-and-motion transmission means interposed between said end of said second handle and said outer periphery of said knife member for transforming strokes of the second handle into a pivotal closing movement of the knife member toward the cutting plate, wherein said second cutting edge comprises successively from the first end thereof to the second end a reception zone without cutting function, a first cutting zone with a first convex projection, a second cutting zone terminating in an uphill part of a second convex projection, a third cutting zone beginning in the downhill part of said second convex projection, and an all-concave terminal fourth cutting zone.

* * * * *